(12) United States Patent
Kimura et al.

(10) Patent No.: US 7,406,441 B2
(45) Date of Patent: Jul. 29, 2008

(54) SYSTEM AND METHOD FOR ONLINE HUMAN RESOURCE OUTSOURCING AND PORTAL ACCESS

(75) Inventors: Eddy H. Kimura, North Barrington, IL (US); Shane Hopkins, Chicago, IL (US)

(73) Assignee: ACS HR Solutions LLC, Pittsburgh, PA (US)

( * ) Notice: Subject to any disclaimer, the term of this patent is extended or adjusted under 35 U.S.C. 154(b) by 0 days.

(21) Appl. No.: 11/268,321

(22) Filed: Nov. 7, 2005

(65) Prior Publication Data
US 2006/0200537 A1    Sep. 7, 2006

Related U.S. Application Data

(63) Continuation of application No. 09/595,114, filed on Jun. 16, 2000, now abandoned.

(60) Provisional application No. 60/170,013, filed on Dec. 10, 1999.

(51) Int. Cl.
*G06Q 30/00* (2006.01)

(52) U.S. Cl. ............ 705/26; 705/1; 705/4; 705/14; 705/36 R; 705/37

(58) Field of Classification Search ............ 705/1, 705/4, 14, 26, 27, 36 R, 37; 709/19
See application file for complete search history.

(56) References Cited

U.S. PATENT DOCUMENTS

| 4,648,037 | A | | 3/1987 | Valentino |
| 5,799,151 | A | | 8/1998 | Hoffer |
| 5,913,198 | A | * | 6/1999 | Banks ............ 705/36 R |
| 6,092,047 | A | * | 7/2000 | Hyman et al. ............ 705/36 R |
| 6,266,648 | B1 | * | 7/2001 | Baker, III ............ 705/14 |
| 6,466,783 | B2 | | 10/2002 | Dahm et al. |
| 6,735,569 | B1 | * | 5/2004 | Wizig ............ 705/4 |
| 2002/0069077 | A1 | * | 6/2002 | Brophy et al. ............ 705/1 |
| 2003/0018498 | A1 | * | 1/2003 | Banks ............ 705/4 |

\* cited by examiner

*Primary Examiner*—Yogesh C Garg
(74) *Attorney, Agent, or Firm*—McCarter & English, LLP

(57) ABSTRACT

An system and method for online human resource outsourcing is provided via online and through portal access such as obtained when utilizing wireless applications.

16 Claims, 5 Drawing Sheets

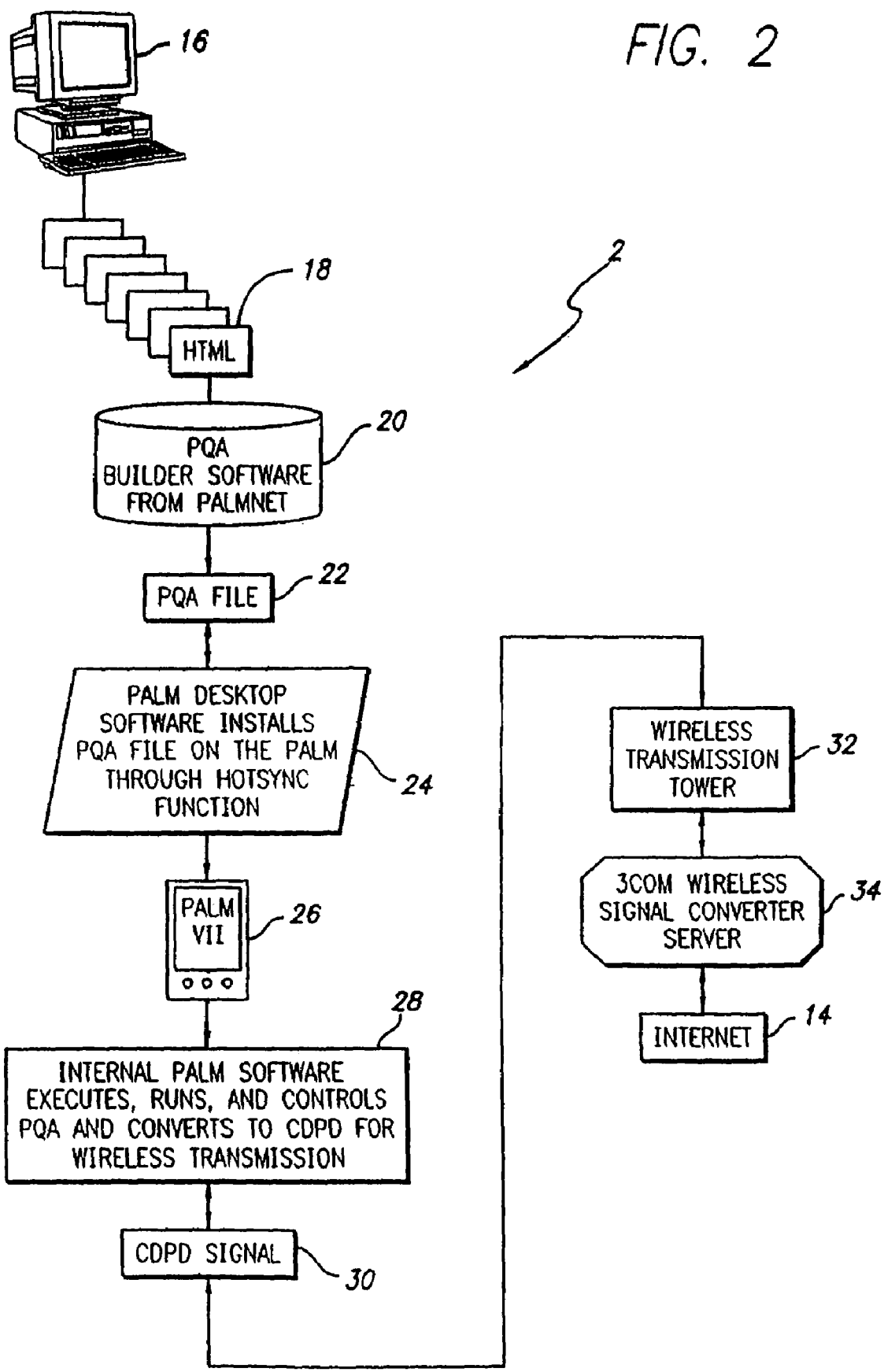

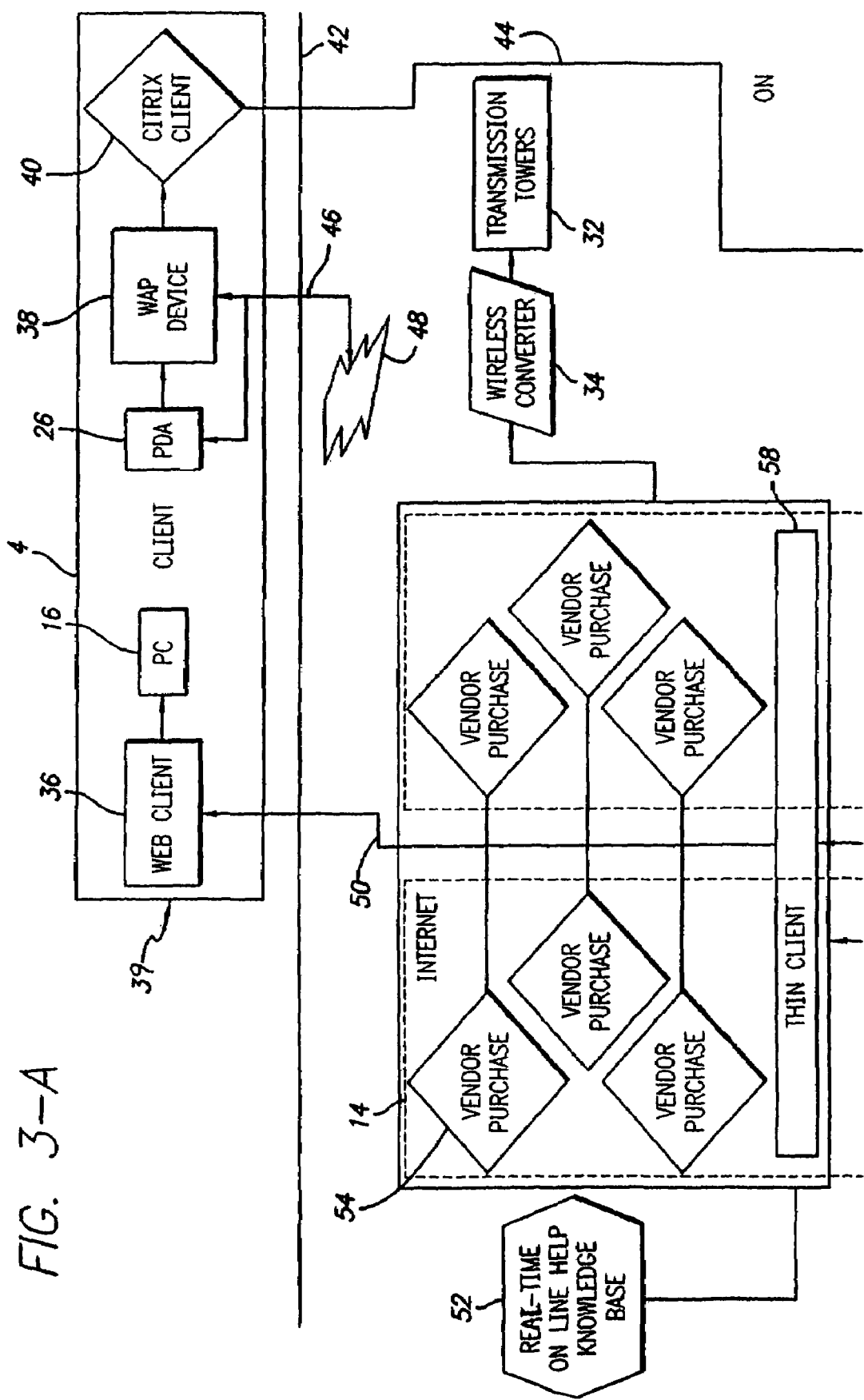
FIG. 3-A

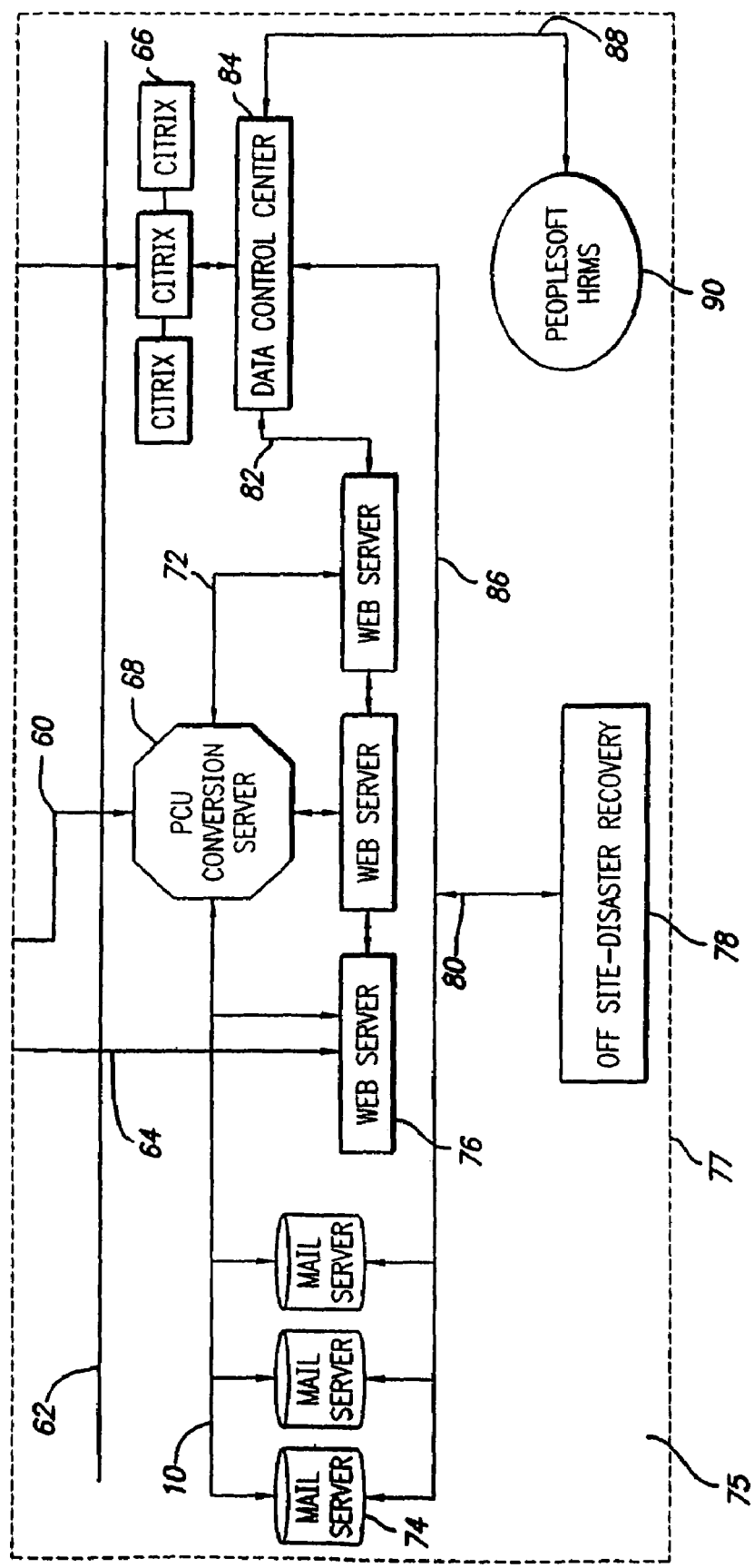
FIG. 3-B

SYSTEM AND METHOD FOR ONLINE HUMAN RESOURCE OUTSOURCING AND PORTAL ACCESS

CROSS-REFERENCE TO RELATED APPLICATIONS

The present application is a continuation of U.S. application Ser. No. 09/595,114, filed Jun. 16, 2000, now abandoned which claims the benefit under 35 U.S.C. § 119(e) of U.S. Provisional Application No. 60/170,013, filed Dec. 10, 1999, both of which are hereby incorporated by reference in their entirety for all purposes.

BACKGROUND OF THE INVENTION

In a typical employer-employee relationship, an employer will provide employees with benefits, such as health insurance, retirement plans, 401(k) plans, etc. Many employers will also offer additional benefits to employees, ranging from gym memberships to discounts on products and the like. A fundamental purpose of all such benefits is to strengthen the tie between the employee and his employer. In fact, with the increasingly dynamic job market of today, benefits have become such an important part of the employer-employee relationship that the value of the benefits are estimated to be within 10-40% of a given base salary. As retaining employees and replacing employees who leave becomes increasingly difficult in terms of both the availability of suitable candidates, and in terms of the actual cost of training new employees, employers are trying to maximize the benefits they provide their employees so as to strengthen the employer-employee bond in order to reduce turnover. Nevertheless, given the high administrative and other related costs, minimizing the associated costs has been an elusive goal, particularly considering the lack of economies of scale and efficiencies in the prior art methodologies.

By way of example, inefficiency is inherent in prior art methodologies because in most cases, the employer must arrange or negotiate with a third party for provision of such benefits. Some groups have tried to engineer multi-corporate buying pools. However, these organizations lack information regarding the employee base so that the organizations are not able to offer appropriate benefits at the appropriate time. Given that administration of the corporate human resource function has been traditionally provided in-house, and has been primarily based on paper oriented transactions, it is an increasingly expensive, cumbersome process. To address this problem, more recent prior art solutions over the past decade have tried to replace this type of internal operation with an outsourced, technologically enhanced function which is directed to the administration of benefit plans (e.g., 401(k), pension plans, medical plans, etc.). To this end, strategies have been developed to allow employers to outsource all non-benefit human resource functions themselves (e.g., recruiting, training), however, even the more recent prior art approaches to outsourcing have severe limitations, not the least of which is that they are essentially limited to certain human resource functions, which does not provide for the outsourcing of strategic human resource activities, (e.g., policy, design, development), or business advisory elements which directly add value to employee contribution and organization performance. Moreover, the recent prior art approaches do not maximize the economies of scale, which can be formed in large scale, centralized buying pools.

Furthermore, when employers have generally provided for a systematic administration of traditional benefit plans, they have also provided for non-traditional benefits but have yet to find an efficient approach to administering them. However, the recent popularity of non-traditional benefits (such as discounts from third parties) has added yet further difficulties for integration with the prior art methodologies. This is because all benefits (especially non-traditional benefits) have traditionally been haphazardly administered, with the resulting effect being that many employees do not take advantage of such benefits because they simply do not know about them as employees and are often unaware of certain things such as corporate discounts on goods and services, as well as all other manner of human resource benefits. Moreover, in some cases, they cannot fully appreciate the applicability of the benefits to their personal and professional lives. These shortcomings also stem from the fact that information regarding these benefits is almost never customized to match the needs or interests of each individual employee.

SUMMARY OF INVENTION

The present invention provides data to benefit recipients across an electronic portal with wireless access, by means of an electronic portal network, a wireless network connected to said electronic portal network for receiving signals to be transmitted to said electronic portal network and for sending signals to be transmitted from said electronic portal network, and a client based computer system having wireless access capabilities for sending the signals to be transmitted to the electronic portal network and for receiving the signals transmitted from the electronic portal network, together for requesting and accessing said benefit resources data.

The foregoing and other features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

BRIEF DESCRIPTION OF THE DRAWINGS

FIG. 2 is a data flow diagram of a preferred embodiment of the invention;

FIG. 3 is a detailed data flow diagram of the invention;

DETAILED DESCRIPTION OF THE INVENTION AND PREFERRED EMBODIMENTS

The present invention provides improved administration and access of benefits to employees, dependents, former employees and all other benefits recipients. In order to provide for the improved access and administration to the improved benefits, the present invention also provides that at least three levels of self-service will be available to employees: voice response system, internet access and customer service centers, all with the contemplated reduced costs of administration and greater accessibility for employees. In so providing, the present invention further supports improved Awork@ related (i.e., traditional work benefits) transactions, and Anon-work@ related transactions, such as those where a third party outsourcing coordinator will provide the employees with access to discounts on goods and services, etc.

Hence, the present invention allows the third party coordinator to provide the employees with systematic and real time access to these discounts to expand the number of goods and services for which discounts are available so as to provide for a larger, more centralized volume of scale and systemized efficiency in administration, and to notify each individual employee of goods and services of which the employee, in particular, may need and which are available at a discount on the basis of the employment relationship. In doing so, a portion of the discount may be passed directly to the employee as an incentive to purchase the goods or services. The remaining portion of the discount may then be provided to the employer to further reduce or eliminate the cost of administering human resource benefits.

With such an efficient, multi-pronged approach, and given the further inventive online access and distribution of benefits, the benefit provider (i.e., employer) can provide the benefit recipient (i.e., usually an employee) with information which is relevant to his personal and professional concerns, and can provide the ability to purchase goods and services at a discount through customized access to the internet.

This allows employees to understand that their benefits extend beyond just a paycheck and 401(k) plan, and as the distinction between work and home begins to fade, employees will then have more factors to consider before deciding to leave his present job.

Figure 1:
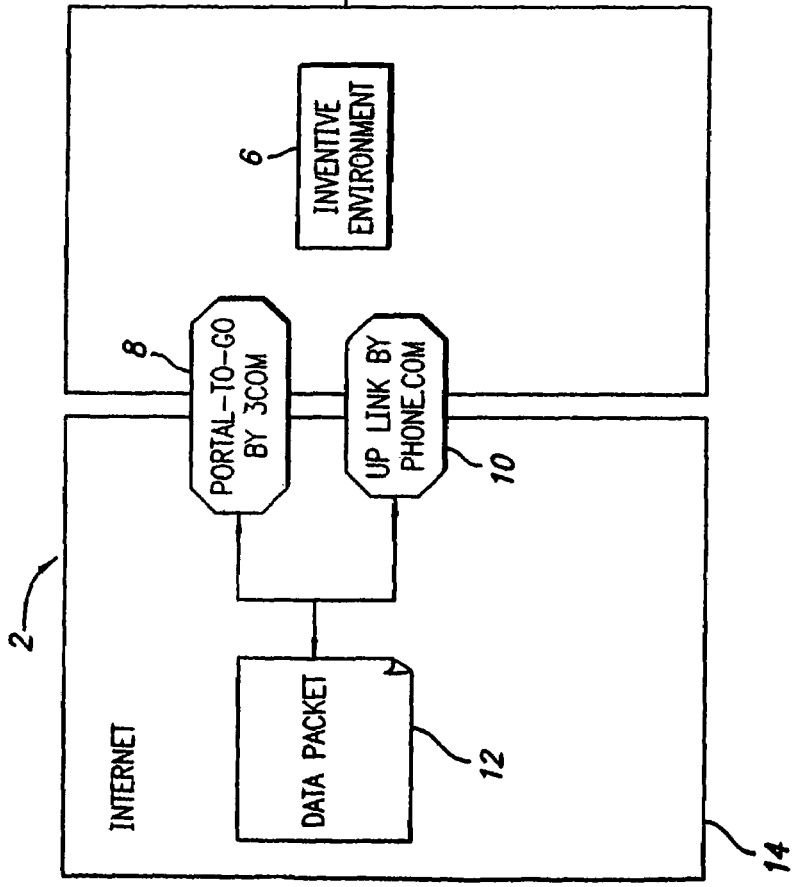
FIG. 1 is a block diagram of the invention.

As seen in FIG. 1, is a broad over view of the system and method for online human resource outsourcing and portal access, centered around a structural business arrangement and portal 2 for accessing the benefits thereof. In terms of the various methods of accessing portal 2, the present invention contemplates at least three separate portal entries: via PC (personal computer), PDA (personal digital assistant), and phone connection, any one of which may be done via either a wired connection, or as contemplated in the preferred embodiment, via a substantially wireless connection. In one embodiment, user 4 accesses the inventive environment 6 via either online portal 8 (for PC and PDA connections), or via a phonelink 10 (for regular or cell phone connections) in order to access or send data packet 12 via the internet.

As mentioned, one embodiment of the present invention contemplate a PC Interface, and this embodiment would involve a User Interface or front-end which will preferably be constructed of mainly HTML based documents running on a variety of different machines (such as, Compaq, Dell, IBM or other such computers known in the industry) and will be utilized in coordination with many different types of software, such as IIS, WindowsNT, Unix or other known industry standard. Such an interface might involve a general layout of the site was created with storyboards, with a set of simple HTML documents as known in the art, that once uploaded, act as the webpages available to the PC or laptop computer user.

Figure 4:
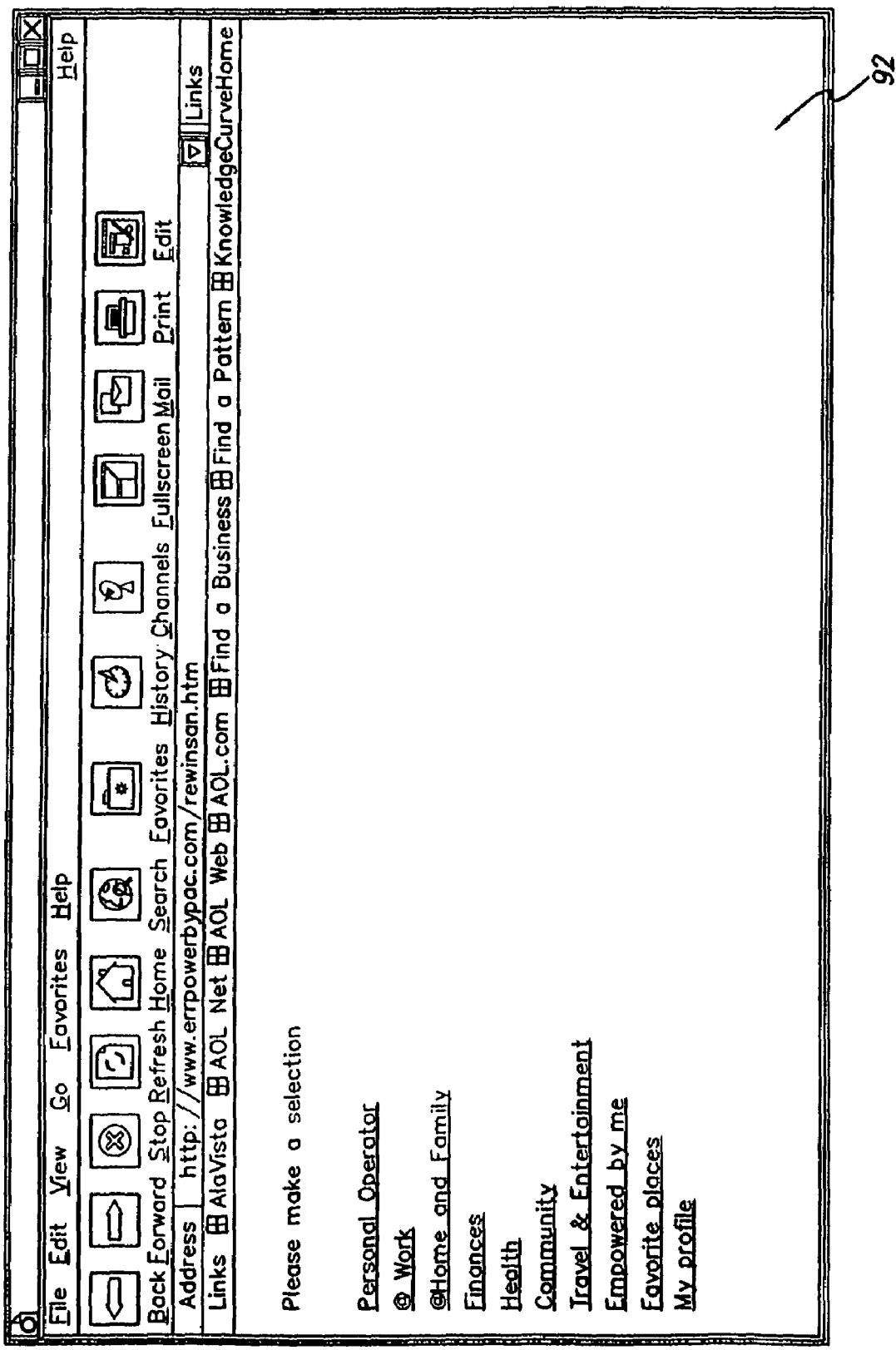
FIG. 4 shows a typical index page 92 from which a user may make a selection.

Turning to FIG. 2, is a broad overview of the preferred embodiment of the data flow from the client perspective. Although data from data packet 12 may flow through any of the above detailed portal entries, in an especially preferred embodiment, a wireless PDA such as the PalmVII sold by 3 Com Corp. of Santa Clara, Calif. (USA) will be utilized. As such, data flow from user 4 utilizing the most preferred embodiment might involve powering up PDA 26 and tapping on a proprietary icon to begin the access. An internal Application Launcher Software (also available from 3 Com Corp.) 24 would open PQA (Palm Query Application) file 22 (or a web clipping file, not pictured), all of which would be derived from PQA builder software 20 from the Palmnet Program (also available from 3 Com Corp.) 20, and stems from HTML files 18, created at 16, which open by default index page 92 (see FIG. 4). Accordingly, index page 92, and the rest of the HTML documents, make up the installed PQA file 22 reside one the PDA 26 itself.

For interfacing to continue, user 4 will be prompted for a user name and a personal identification number via an HTML form. Once entered, the form request is converted at 28 to a CDPD (cellular data packet delivery) signal 30 and transmitted to the nearest communication tower 32, such as those supplied and maintained by 3Com Corp. Communication tower 32 will then send CDPD signal 30 to a conversion server 34 (such as those manufactured by 3Com Corp.). Conversion server 34 will convert the CDPD signal to an internet friendly language such as HTML (or any other comparable language) and then will send data packet 12 through internet 14.

Turning towards an even more detailed view of the process in FIG. 3, is the substance of the preferred elements and a connectivity in the inventive method and system, in terms of an exemplary data flow, as seen say, the perspective of user 4 in a client environment 39. The starting point then, of previously mentioned access tools personal computer 16 which preferably uses Windows 99 available from Microsoft Corp. of Redmond, Wash. (USA), PDA (such as PalmPilot VII) 26, and WAP (wireless application protocol) device 13 (i.e., cell phone or other device that utilizes WAP protocol to access the internet). Provided in client environment 39 is web client 36, which is capable of receiving or transmitting, through an optional firewall 42, data packets 12 along connection 50 to internet 14. Similarly, PDA 26 and WAP device 38 may connect to internet 14, along a wireless based connection, beginning with PDA to wireless tower input/output 46, the input/output of which includes capability for transmission and reception of signals such as CDPD, XML, analog WML, CDML, GSM or any other type of WAP languages as known in the art. Wireless signal 48 is either received or transmitted in concert with transmission towers 32, which transfer data packet 12 to internet 14 via wireless converter 34 (essentially server hardware and software that converts any web language to a wireless signal and vice versa, such as that available from wireless providers such as Bell South Corporation of Atlanta, Ga. (USA)). Client environment 39 may further be provided with a server such as that available from Citrix Corporation, of Fort Lauderdale, Fla. (USA), for direct access along connection 26 to a data control center 84, for direct data access between the client and the data warehouse.

Connected to internet 14 are at least one, and most preferably, a plurality of vendors 54 whose participation will be arranged by a third party enterprise 75. In the course of all operations, third party enterprise 75 will preferably offer a real time online help knowledge database (utilizing hardware and software technology provided by Ask.Com, or Net effect) for providing the improved access of benefits information to client (i.e., employee) from third party enterprise 75.

Figure 5:
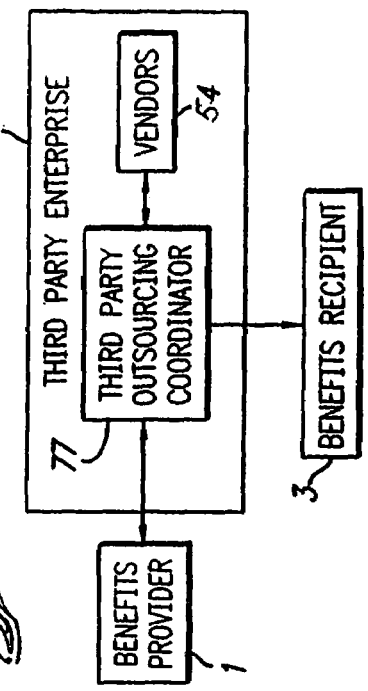
FIG. 5 is a block diagram showing use of the invention.

As seen in FIG. 5, third party enterprise 75 comprises at least two main third party components who service the benefits provider 1 (i.e., an employer, social service organization, government agency, etc.) and the benefits recipient 13 (i.e., employee, former employee, aid recipient etc.) (user 4 will, in an especially preferred embodiment, be an employee or former employee): (1) third party outsourcing coordinator 77; and, (2) vendors 54. As discussed herein in greater detail, vendors 54 are coordinated as participants with respective benefits provisions by at least third party coordinator 77 (and in some cases by the benefits provider who would, in a most preferred embodiment, relinquish administration of any benefits related relationships with vendors where not supplanted by analogous relationships of third party outsourcing coordinator 77). Third party coordinator 77 will contract and establish relationships on a case by case basis, for provision of efficient access to benefits recipients. The two main components, third party outsourcing coordinator 77, and vendors 54, are connected via the internet 14, and most preferably via thin client 58, such as the Portal Website, and across firewall 62 to web server 76 via patch 64. Web server 76 will primarily comprise at least one or more web servers running on an operation system such as Windows NT available from Microsoft Corp. and IIS, available from Microsoft Corporation of Redmond Wash. (USA). Connected thereto along path 70 will be mailservers such as Microsoft Mail, or other type mail server for receiving, storing and logging mail received in connection with the operations of the system. Also connected to Web Server 76 (and mailservers 74) is portal configuration server 68, which is a server which utilizes portal conversion software such as that produced under the trademark Portal-to-go, owned by Oracle Corporation of Redwood, Calif. (USA). As previously alluded to, at least one Master Server 66 (such as the Compaq Prolinea, Dell server or other industry known standard running software from Citrix Systems), which serves as an outside connection to client server 40 (such as the Compaq Prolinea, Dell server or other industry known standard running software from Citrix Systems) along conduit 44, which is useful for Direct data access. Through conduit 44, direct two way data access is achieved through a dedicated line from the client environment to inventive environment 6. This is accomplished through the use of the aforementioned server or through any PC Anywhere-type device as known in the industry combined with a T1 bundle which can comprise lines such as ISDN, T1, Bundled T1s, T3 or other lines, as known in the art. Master Server 66 is connected to Control Center 84, which can consist of Dell, Compaq or other hardware Running Windows NT, Unix or other. Data Control Center 84, is preferably a multi-platform data center for wharehousing large amounts of data, and may be based on Sybase SQL development tools available from Sybase, Inc. of Emeryville, Calif. (USA), based on a relational database management system, such as that available from Oracle Corporation of Redwood Shores, Calif. (USA), utilizing Windows NT operating system and a Common Object request Broker Architecture ACORBA@(for use as communications components of the object management architecture), Net Ware Network Operating Systems, sold by Novell Inc., of Provo, Utah (USA), IIS from Microsoft, etc., and may use Unix-type operating systems such as those available from Novell's Unix Systems Group of Novell, Inc. Data Control Center is also attached to Web Servers 76 along path 82, and to Mail Server 74 along path 86, and to Benefits input/output module 90, along path 88. Benefits input/output module 90 is a Data Management Server which operates software such as that sold under the trademark People Soft version 7.5x available from PeopleSoft Corp. of Mountain View, Calif. (USA), or other equivalent (AHRSM@) input/output softwares. The purpose of benefits input/output module as is to provide data on personnel. In a most preferred embodiment, the entire physical architecture described above will be backed-up by offsite disaster recovery module 78 as known in the art, by being connected to each of the various physical modules, described above, along path 80.

Thus, in terms of the data flow of data packets 12 in an exemplary transaction, data packets 12 are sent via TCP/IP protocol and are routed to the proper IP address as requested by the original HTML form request as filled out by user 4. Since this particular transaction is preferably performed on a PDA 26, there is no reason for user 4 to be connected with say, a thin client (i.e., a web based user interface) as the PQA 22 is the thin client in the preferred embodiment. Passing over the thin client, and directly accessing the back end of innovative environment 6 (FIG. 1) is a result of the IP address destination being generated from the query. Continuing to trace the next segment, seen in FIG. 3, data packet 12 penetrates firewall 62, which comprises switches/routers (such as those available from 3 Com Corp. Sunnyvale, Calif. (USA) or other standard routing equipment as known in the art) to filter out certain data by reading the data packet header to filter out/in certain ranges of IP addresses. Once successfully through the firewall 62, data packets 12 will enter the Portal Converter 68, which is preferably a server such as the Prolinea Server made by Compaq Computer Corp. of Houston, Tex. (USA), or any industry known standard server which can run software such as Portal-To-Go Software™, available from Oracle Corporation, which will convert any signal to HTML or other web friendly language. Once data packet 12 has successfully has reached the back-end of the inventive environment 6 it can now travel around freely, via TCP/IP to find the proper database, mailserver, or web site that has been requested.

With respect to the preferred embodiment of the PDA interface in FIG. 2, the same can be obtained by building a set of the same files 18, which can be taken and run through PQA builder 20, as part of the SDK (Software Development Kit) available from Palm.net of 3 Com Corp. PQA builder 20 creates PQA file 22 from HTML documents 18 that are fed into it. PQA file 22 that results is preferably installed on the PDA (i.e., the Palm VII from 3Com Corp.) via the Hotsync function 24. The purpose of PQA 22 is to take a skeleton of the web site and pre install it on PDA 26 (see FIG. 4). Accordingly, provided for user 4 of PDA 26 can move through the majority of the web site with out the need for a wireless transaction. However, in terms of the previously mentioned phone interface, the interface thereon would be different because an entire different set of files would need to be created for the phone portion of portal 2. The WAP version would preferably be programmed in XML (extensible mark up language) documents called cards, which are very simple HTML-like documents. A full rundown on this process is available through the free online SDK (software development kit) available from www.phone.com, the complete set of cards may be stored on a proprietary server such as Compaq, Dell or other, which will be accompanied by UP Link server software (also available from www.phone.com) or can be stored directly on the phone.com server for a fee. Provision of such an architecture allows that a multitude of web enabled phones or wap devices may be utilized as WAP devices may be defined (but are not limited to) wireless PDAs and WAP cellular phones such as those available from Motorola Inc. of Schaumberg, Ill., (USA), however, other devices using WAP are explicitly contemplated by the present invention.

As detailed earlier, the present system and method may be utilized for all manner of institutional benefits outsourcing, but in a most preferred embodiment, will relate to the beneficial relationship between employers and present or former employees and as such, these terms may be interchanged throughout the logistics of the method of the present invention may be described in related segments called steps. The preferred procedural process of the invention thus begins with a first step when the employer enters in to an outsourcing agreement with a third party coordinator. This outsourcing arrangement could be for the administration of a single benefit plan, multiple benefit plans, a single corporate function or some combination thereof, up to, or even including, the entire corporate human resource function. Under a set of terms of the outsourcing agreements, employers would agree that these employees will become part of the buying pool, in order to achieve maximized buying power/discounts.

Turning toward a second step in the preferred procedural process, as part of the outsourcing, third party outsourcing coordinator 77 compiles various information on each employee and his household. Information collected typically includes data such as the employee's sex, age, address, marital status, salary, employment history and job classification. Additionally, third party outsourcing coordinator 77 would receive information regarding the employee's spouse and dependents such as their gender, ages, and addresses. In cases where third party outsourcing coordinator 77 administers the employer's health care, third party outsourcing 77 coordinator would also collect information regarding the relevant health care history of the employee and his or her spouse or dependents.

In the course of administering the human resource function, third party outsourcing coordinator 77 is preferably updated as to the data which changes for the employee and his employee household. In an especially preferred embodiment, the invention will provide for the case of former employees such as retirees and terminated vested employees, but in any case, the third party coordinator may need to provide incentives to receive updates on such information. The incentives could include, for example, a provision of a free PDA, which provides access to the outsourced function as well as access to the internet. In a preferred embodiment, third party outsourcing coordinator 77 will maintain, update and access the employees information using software such as a human resource management system found in PeopleSoft, version 7.5x.

In a third step in the preferred procedural process, third party outsourcing coordinator 77 provides managers and employees with real time direct access to the human resource related information and transactions. The real time may be provided by setting up at least three levels of self-service, which will be available—voice response system, internet access and customer service centers. Internet access will be available over the employees computer (if the employee owns one), public kiosks (if available to the employer), as well as through the previously mentioned wireless technology such as the PDA (i.e., Palm VII) or cellular phones. Third party outsourcing coordinator 77 will provide the employee with useful information relevant to his or her interests such as benefits, health care, 401k, personal or other info), and relates to his personal professional concerns (such as scheduling, expenses etc). Provision of such will enable the third party coordinator will be able to treat each individual employee as a unique market and customize the information for that employee. Accordingly, the employee will be more inclined to use the internet access (i.e., portal 2) third party outsourcing coordinator 77 as his general portal to internet 14 and will begin to see the distinctions between work and personal life disappear.

Looking next to a fourth step in the preferred embodiment, the third party coordinator will enter into outsourcing arrangement with numerous employers. Third party outsourcing coordinator 77 will combine the various groups of employees into one buying pool. Because the number of households in this buying pool would be in the millions, the buying pool will have significantly more power than a single company buying pool instance thereby reducing costs below those which might be achieved outside of the pool.

Turning to a fifth step in the preferred embodiment, by using the market power of the buying pool, third party outsourcing coordinator 77 can negotiate arrangements with providers of goods and services, i.e., vendors 54. Under the terms of the arrangement, vendors 54 will offer discounts on their goods and services in exchange for exposure and access to the buying pool. In addition, the benefits providers 1/employers who enter into the outsourcing with the third party outsourcing coordinator 77 can even make their own consumer goods and services available to the buying pool at a discount. Hence, third party outsourcing coordinator 77 will enter into the arrangements on behalf of the benefits providers 1/employers. When so provided for, the discounts may range between 10% and 30% of the readily available retail price, thereby providing employees with further strengthened bonds with the employer.

In a sixth step, third party outsourcing coordinator 77 will provide the employee and their households direct access to the discounted goods and services via the portal 2, which it has established as part of the outsourcing. As specified, the third party outsourcing coordinator 77 will organize the access to the goods and services under categorical headings such as job and career, personal, finances, health, travel, news and entertainment. As part of the individualized nature of portal 2, user 4 will be able to reorganize the offerings in ways that are logical to him.

Turning to the seventh step in the preferred embodiment, by using the data which third party coordinator 77 originally (and continually) collects as part of the outsourcing, third party coordinator 77 will be able to offer particular goods and services to employee households at relevant points in time, thereby treating each individual user 4 as a market of one. For example, upon the birth of a child, third party outsourcing coordinator 77 can subsequently alert user 4 of the availability of discounted goods and services such as child car seats, day care providers and toy stores. As a child reaches certain ages, the third part coordinator can then bring to the employee products such as pre-SAT courses. Other examples of discounted goods and services might include items such as airline flights, hotels, groceries, pharmaceuticals, clothing, gym memberships, buying club memberships, phone services, and books. In the preferred execution of this step, third party outsourcing coordinator 77 will not allow the providers of goods and services to initially contact the employees directly.

When structured as such, the benefit recipients 13/employee will be inclined to purchase the goods and services through third party outsourcing coordinator 77 for several reasons. First, the goods and services (and any discounts associated therewith) are easily accessible in accordance with the online module described herein. The benefits recipients 13/employees will be aware of which goods and services are available, and will be able to access those goods and services at times and in ways that are convenient for each individual benefit recipient 13/employee. Second, the nature and timing of the particular goods and services offered to benefit recipient 13/employee will often be customized to the needs of each particular benefit recipient 13/employee. Finally, regarding the goods and services which will be offered at a significant discount, the details thereof can easily be discovered and ordered by way of one of the internet capable devices, such as a personal computer, described herein, as it will allow real time access to the goods and services relevant to each individual employee at a discount.

As an eighth step in the preferred embodiment, the discounts will primarily be provided to the benefit recipient 13/employees as an incentive to purchase goods. However, in an especially preferred embodiment, a percentage of the discount will be provided to the benefit provider 1/employer as a means of reducing or eliminating the cost of the outsourcing. This will enable the benefit provider 1/employer to reduce the costs associated with administration and payment of plan enrollments to at or near zero, if desired. The employer will then work with third party outsourcing coordinator 77 to determine how much of the discount is provided to the benefit recipient 13/employee and how much is to be provided to the benefit provider 1/employer himself Although the benefit provider 1/employer and third party outsourcing coordinator 77 may determine to apply the same division to all providers. This determination is done on a supplier by supplier basis.

For a broad example of the resulting cost savings/impact of the overall system in an employment situation, the average cost of administering human resource benefits for employers who have between 10,000 and 25,000 employees is estimated at $1600 per employee according to industry estimates. By outsourcing the administration of benefits in accordance with the present invention, this cost can typically be reduced to $1440, a 10% reduction. Outsourcing the payroll function typically reduces human resource administration cost to $1510, a 5.5% reduction. By outsourcing the entire human resource function according to the system described below, other than strategic planning, employers can potentially cut the cost of the administering the human resource function in half, to $800 per employee. Also by way of example, in a specific case, where a provider of say, car seats for children is providing a 20% discount to the buying pool, this discount could be split 15% for the employee and 5% to the related employer. If the cost of the administering the human resource function is reduced from $1600 for each employee to $800 for each employee if the human resource function is totally outsourced, this invention will allow that $800 to be reduced to potentially zero.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for managing and delivering employee benefits to reduce cost to at least one employer for administration of a human resource function, comprising:
   a. at least temporarily storing information provided by the at least one employer indicative of interests of respective employees;
   b. processing the stored information such that the employees are organized into at least one buying pool based on common ones of the interests;
   c. at least temporarily storing information relating to vendors of employee benefits;
   d. obtaining a discount for employee benefits provided by the vendors by matching the common interests upon which the buying pool is based with the stored information relating to vendors;
   e. calculating a percentage of the discount to be deducted from the cost of the benefit to the employee to determine a discounted price for the benefit;
   f. offering the benefit for the employee at the discounted price via a portal web site; and
   g. providing an employer portion of the discount to the at least one employer to reduce administration cost;
   wherein at least steps a, b, c, and e are performed using at least one networked computer system.

2. The method of claim 1, wherein at least temporarily storing information provided by at least one employer, includes at least temporarily storing information provided by a plurality of employers.

3. The method of claim 1, wherein processing the stored information such that the employees are organized into at least one buying pool based on common ones of the interests, includes processing the stored information such that the employees are organized into a plurality of buying pools based on respective common ones of the interests.

4. The method of claim 1, wherein the information is provided by the at least one employers via the portal web site.

5. A method for managing employee benefits to reduce cost to at least one employer for administration of a human resource function, comprising:
   a. providing a portal web site for managing the employee benefits;
   b. receiving employee information provided by the at least one employer indicative of interests of respective employees;
   c. organizing the employees into at least one buying pool based on common ones of the interests;
   d. procuring a discount against a cost of a product from at least one vendor for the employees in the buying pool by matching the common interests upon which the buying pool is based with stored information relating to at least one vendor;
   e. offering the product with an employee portion of the discount at the portal web site to employees in the buying pool; and
   f. providing an employer portion of the discount to the at least one employer to reduce administration cost;
   wherein at least steps b, c, and d are performed using at least one networked computer system.

6. The method of claim 5, including calculating the employee portion of the discount to be passed to the employee.

7. The method of claim 6, wherein calculating the employee portion of the discount includes allocating a portion of the discount as an administrative fee to reduce the administration cost and allocating a remainder of the discount as the employee portion of the discount.

8. The method of claim 5, wherein procuring the discount against the cost of the product includes procuring the discount against the cost of a good.

9. The method of claim 5, wherein procuring the discount against the cost of the product includes procuring the discount against the cost of a service.

10. The method of claim 5, wherein procuring the discount includes providing the vendor with characteristics of respective employees.

11. The method of claim 5, including providing the vendor with an event point for an individual employee associated therewith.

12. The method of claim 11, including offering to the individual employee at the portal web site an event point product associated with the event point.

13. A method for managing and delivering employee benefits to reduce cost to at least one employer for administration of a human resource function, comprising:

providing a benefits coordinator computer system with a portal web site for managing the employee benefits;

receiving employee information indicative of interests of respective employees at the benefits coordinator computer system from at least one employer computer system;

organizing the employees into at least one buying pool based on common ones of the interests;

procuring a discount from a vendor computer system for the employees of the buying pool by matching the common interests upon which the buying pool is based with stored information relating to at least one vendor;

offering the product with an employee portion of the discount at the portal web site to employees in the buying pool; and providing an employer portion of the discount to the at least one employer to reduce administration cost.

14. The method of claim 13, including calculating the employee portion of the discount to be passed to the employee.

15. The method of claim 13, including providing the vendor computer system with an event point for an individual employee associated therewith.

16. The method of claim 15, including offering to the individual employee at the portal web site an event point product associated with the event point.

* * * * *